(12) United States Patent
Myers

(10) Patent No.: US 6,609,799 B1
(45) Date of Patent: Aug. 26, 2003

(54) FIELD-OF-VIEW CONTROLLING ARRANGEMENTS

(75) Inventor: Kenneth J. Myers, Dobbs Ferry, NY (US)

(73) Assignee: Edward Greenberg & Michael Perry, Irvington, NY (US)

( * ) Notice: Subject to any disclaimer, the term of this patent is extended or adjusted under 35 U.S.C. 154(b) by 0 days.

(21) Appl. No.: 10/114,246

(22) Filed: Apr. 3, 2002

Related U.S. Application Data

(62) Division of application No. 09/846,455, filed on May 2, 2001, now Pat. No. 6,443,579.

(51) Int. Cl.[7] .............................................. G02B 27/00
(52) U.S. Cl. ....................... 359/613; 359/614; 359/615; 359/599
(58) Field of Search .................... 359/613, 614, 359/615, 599, 431, 831, 832, 833, 834

(56) References Cited

U.S. PATENT DOCUMENTS

| | | | |
|---|---|---|---|
| 2,909,770 A | 10/1959 | Pugsley |
| 3,718,078 A | 2/1973 | Plummer |
| 3,902,787 A | 9/1975 | Sherlock |
| 3,971,051 A | 7/1976 | Baker et al. |
| 4,165,920 A | 8/1979 | Brown |
| 4,206,969 A | 6/1980 | Cobb et al. |
| 4,309,073 A | 1/1982 | Nishimura et al. |
| 4,309,074 A | 1/1982 | Granieri, Jr. |
| 4,708,435 A | 11/1987 | Yata et al. |
| 4,730,897 A | 3/1988 | McKechnie et al. |
| 4,756,603 A | 7/1988 | Ohtani |
| 4,911,529 A | 3/1990 | Van De Ven |
| 5,208,620 A | 5/1993 | Mitsutake et al. |
| 5,316,359 A | 5/1994 | Lansinger |
| 5,363,237 A | 11/1994 | Wakatake |
| 5,400,114 A | 3/1995 | Yoshida et al. |
| 5,446,594 A | 8/1995 | Nelson et al. |
| 5,457,572 A | 10/1995 | Ishii et al. |
| 5,512,219 A | 4/1996 | Rowland et al. |
| 5,555,476 A | 9/1996 | Suzuki et al. |
| 5,581,407 A | 12/1996 | Mitani et al. |
| 5,745,199 A | 4/1998 | Suzuki et al. |
| 5,760,955 A | 6/1998 | Goldenberg et al. |
| 5,836,096 A | 11/1998 | Brauer |
| 5,837,346 A | 11/1998 | Langille et al. |
| 6,002,829 A | 12/1999 | Winston et al. |
| 6,025,897 A | 2/2000 | Weber et al. |
| 6,157,491 A | 12/2000 | Watanabe et al. |
| 6,169,633 B1 | 1/2001 | Watanabe |

*Primary Examiner*—Mohammad Sikder
(74) *Attorney, Agent, or Firm*—Bacon & Thomas, PLLC

(57) ABSTRACT

A field-of-view controlling arrangement such as a privacy screen includes a single microprism or lenticular sheet having a plurality of sets of parallel surfaces that intersect to form prisms or lenticular structures, and in which field-of-view control is achieved by (i) for sheets made up of parallel "one-dimensional" microprism or lenticular structures having at least two intersecting sets of mutually parallel surfaces, altering at least two sets of the mutually parallel surfaces, and/or portions of the at least two sets of mutually parallel surfaces, by applying a light-attenuating treatment, (ii) for sheets made up of polyhedral lenticular structures having at least three intersecting sets of mutually parallel surfaces, or at least one set of curved surfaces extending in directions transverse to directions in which the field-of-view is to be limited, altering at least one set of the mutually parallel or curved surfaces by applying a light-attenuating treatment, or (iii) for any type of microprism or lenticular sheet, including a diffusing agent in at least a portion of the sheet, and arranging the surfaces of the microprism or lenticular sheet so that light transmitted along selected optical paths is attenuated before exiting the sheet.

10 Claims, 11 Drawing Sheets

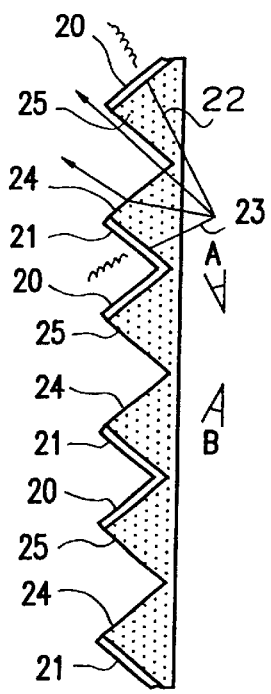
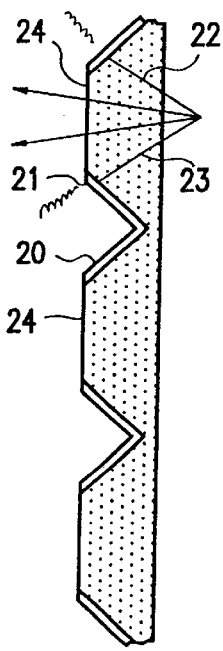
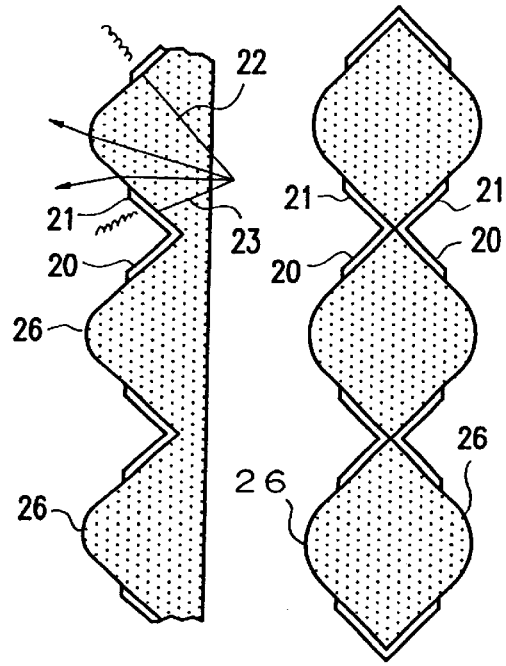
FIG. 4   FIG. 5   FIG. 6   FIG. 7
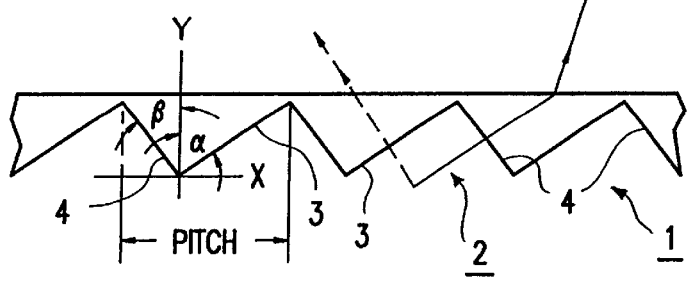
FIG. 2
(PRIOR ART)
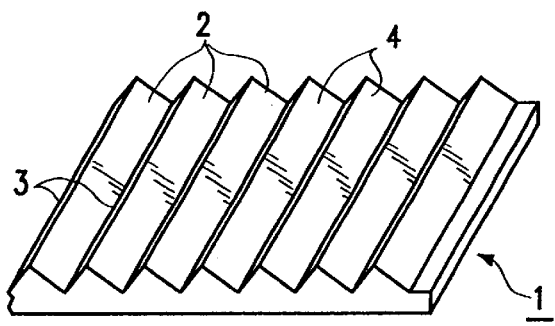
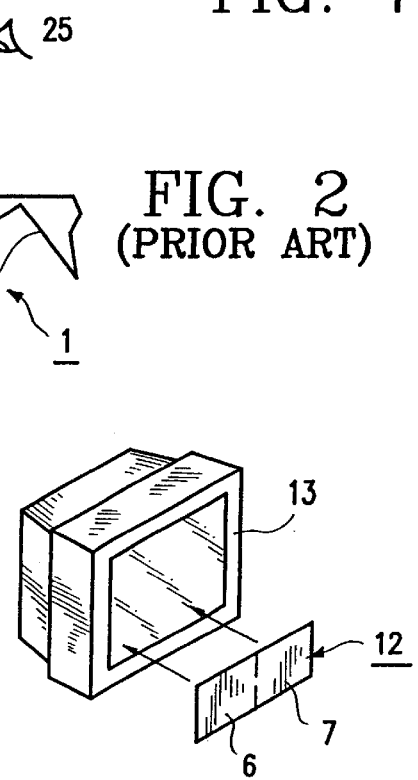
FIG. 1
(PRIOR ART)
FIG. 3
(PRIOR ART)

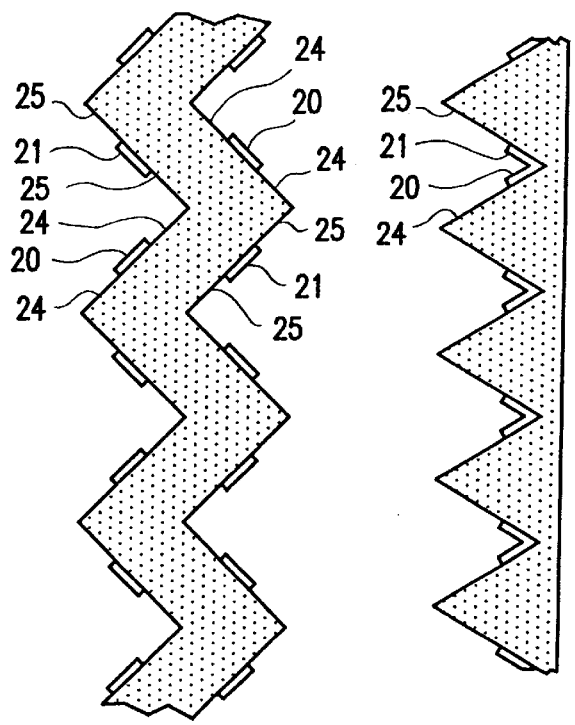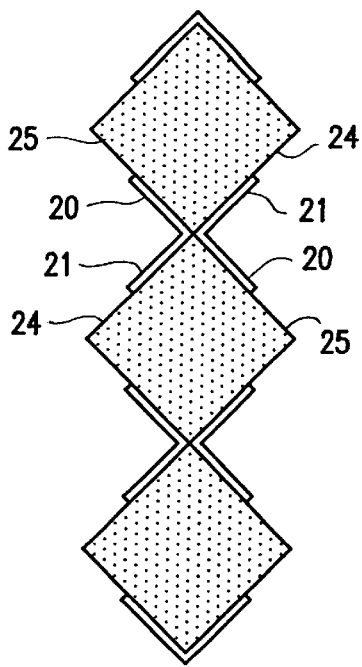
FIG. 8  FIG. 9  FIG. 10
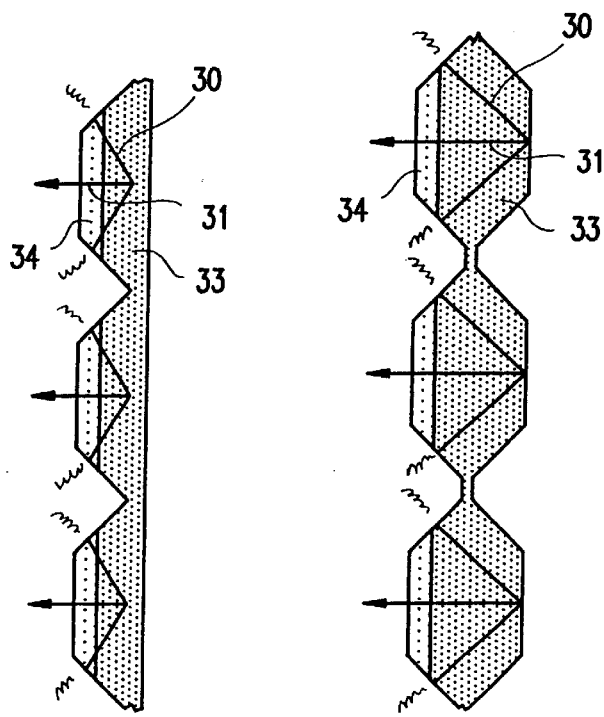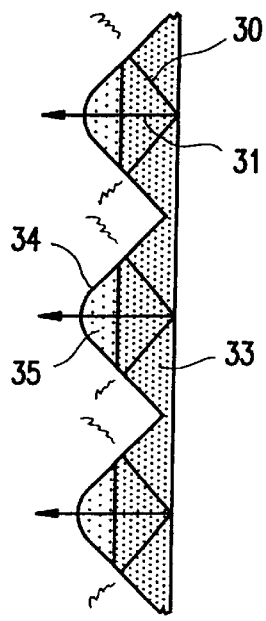
FIG. 11  FIG. 12  FIG. 13

FIELD-OF-VIEW CONTROLLING ARRANGEMENTS

This application is a Division of nonprovisional application Ser. No. 09/846,455 filed May 2, 2001 now U.S. Pat. No. 6,443,579.

BACKGROUND OF THE INVENTION

1. Field of the Invention

This invention relates to field-of-view controlling arrangements, such as privacy screens, made up of microprism or lenticular sheets.

More particularly, the invention relates to a field-of-view controlling arrangement made up of a microprism or lenticular sheet having a plurality of sets of parallel surfaces that intersect to form prisms or lenticular structures, and in which field-of-view control or privacy screening is achieved by:

for sheets made up of parallel "one-dimensional" microprism or lenticular structures having at least two intersecting sets of mutually parallel surfaces, altering a first set of mutually parallel surfaces and at least one second set of the mutually parallel surfaces of the microprism or lenticular structures, and/or portions of the at least two sets of mutually parallel surfaces, by applying a light-attenuating treatment to the surfaces, for sheets made up of "two-dimensional" or polyhedral lenticular structures having at least three intersecting sets of mutually parallel surfaces, or at least one set of curved surfaces extending in directions transverse to directions in which the field-of-view is to be limited, altering at least one set of the mutually parallel or curved surfaces by applying a light-attenuating treatment to the at least one set of mutually parallel or curved surfaces, and for any type of microprism or lenticular sheet, including a diffusing agent in at least a portion of the sheet, and arranging the surfaces of the microprism or lenticular sheet so that light transmitted along selected optical paths is attenuated before exiting the sheet through a first set of surfaces while light transmitted along other optical paths is relatively unattenuated before exiting the sheet through a second set of surfaces oriented at a nonzero angle relative to each of the surfaces in the first set of surfaces, thereby achieving a privacy screen that restricts viewing of an image from more than one side of the potential field-of-view.

The privacy screens of the invention represents an improvement over the privacy screens disclosed in copending U.S. patent application Ser. Nos. 09/583,731, filed Mar. 30, 2000, and 09/481,942, filed Jan. 13, 2000, (both incorporated herein by reference), which disclose privacy screens in which privacy screening is achieved by altering just one set of mutually parallel surfaces or facets of a conventional microprism sheet of the type having a single set of "one-dimensional" prisms, i.e., prisms formed by parallel grooves in the sheet, to attenuate light so as to restrict the field-of-view, for images transmitted by the sheet, to only one side of the field-of-view.

The privacy screens of the invention may be used as overlays for video displays, for example to restrict eavesdropping with respect to a computer display, or as window coverings. When used as window coverings, the privacy screens of the invention have the additional advantage that the prisms or lenticular structures that make up the screen may be used to bend incoming light and improve the view from the window. In addition, the privacy screens of the invention may, at desired angles, include embedded images or graphics, and may provide other screening functions such as attenuation of ultra-violet light or other radiation, polarization, and so forth.

2. Description of Related Art

As illustrated in FIG. 1, the privacy screen disclosed in copending U.S. patent application Ser. No. 09/481,942 is made up of a microprism sheet 1 having multiple sets of parallel surfaces 3,4 that intersect to form prisms defined by adjacent parallel grooves 2.

In order to provide a privacy screening effect, one set of the parallel surfaces 3 is altered by surface treatment to attenuate or scatter transmitted light in selected directions. The result of this arrangement is a simple and inexpensive privacy screen that permits viewing of an image by an observer 25 through the untreated set of surfaces 4, and that prevents viewing of the image through the treated sets of surfaces 3, the angles α and β of the respective surfaces determining the range of angles in which viewing is restricted. Uses for the privacy screen described in copending application Ser. No. 09/481,942 include computer monitor overlays that prevent eavesdropping, stereoscopic viewing devices, and two-player video game arrangements such as the one illustrated in FIG. 3, in which an overlay 12 consisting of multiple sheets 6 and 7 is used to restrict viewing by the respective game players of opposite portions of an image displayed on screen 13.

Although the privacy screen described in U.S. patent application Ser. No. 09/481,942 is ideally suited to applications such as the one illustrated in FIG. 3, in which only one side of the field-of-view of an image needs to be restricted, applications such as eavesdropping prevention often call for restriction of viewing from at least two sides. Furthermore, it would be desirable if additional optical effects could be achieved with a single sheet, even if viewing from only one side need be restricted.

One solution to the problem of limiting viewing from more than one side of the field-of-view is proposed in the above-cited U.S. patent application Ser. No. 09/583,731. According to this solution, privacy screens identical to those described in U.S. patent application Ser. No. 09/481,942 are stacked with the treated sets of surfaces oriented in different directions to restrict the field-of-view of an image from multiple sides. While this solution is simple and effective, the present invention proposes two even simpler solutions, both involving use of a single rather than multiple microprism or lenticular sheets.

The two alternative solutions respectively involve use of surface treatment and bulk diffusion materials, and are discussed separately below.

Surface Treatment

The first alternative solution to the problem of restricting the field-of-view of an image from multiple sides is to use surface treatments similar to those described in the above-discussed U.S. patent application Ser. Nos. 09/481,942 and 09/583,731. However, instead of altering a single set of parallel surfaces of facets of a the microprism sheet to attenuate light so as to narrow the field-of-view of images passing through the sheet, the present invention proposes to achieve privacy screening by altering at least two of the sets of mutually parallel surfaces, portions of the at least two sets of mutually parallel surfaces, or a corresponding set of identically oriented curved surfaces, and in particular by applying a light attenuating surface treatment to the sets of mutually parallel or curved surfaces. The result of such treatment of multiple sets of surfaces is a privacy screen that restricts viewing of an image from more than one side of the potential field-of-view without the need to stack multiple sheets.

As discussed in detail in U.S. patent application Ser. No. 09/481,942, it is of course well-known in general to selectively treat surfaces of a microprism or lenticular structure for the purpose of selectively attenuating light passing through the sheet. However, such treatments had always been, prior to development of the privacy screen disclosed in U.S. patent application Ser. No. 09/481,942, used in a way that attenuates or scatters background light, rather than the image itself, so as to reduce glare or increase image visibility, contrast, or relative brightness. Furthermore, the prior microprism or lenticular structures had always seen combined with other structures to form a rear or front projection screen, rather than being used as a stand-alone sheet or overlay used solely for the purpose of privacy screening.

The numerous prior patents disclosing treatment of microprism or lenticular surfaces to attenuate or re-direct background light for purposes of glare reduction, brightness and contrast optimization, or the like, thus tend to teach away from the invention, which involves intentional attenuation of the image itself, in certain directions. Nevertheless, it should be noted that the same surface treatments disclosed in the prior patents may also be used in connection with the present invention albeit on different surfaces of the sheets. Potentially useful surface treatment techniques include various coating processes such as printing, vapor deposition, or sputtering of opaque or light-scattering materials, delustering, chemical or laser etching, casting, and differential polishing of previously roughened surfaces.

Many of these techniques are disclosed in the following patents directed to microprism sheets in general:
  U.S. Pat. Nos. 5,836,096 (Brauer); 5,512,219 (Rowland et al.) 5,446,594 (Nelson et al.), 5,363,237 (Wakatake), 5,316,359 (Lansinger), 5,208,620 (Mitsutake et al.), 4,708,435 (Yata et al.), 4,309,074 (Granieri), 4,309,073 (Nishimura et al.), 4,206,969 (Cobb et al.), 3,971,051 (Baker et al.), 3,902,787 (Sherlock), and 3,718,078 (Plummer).
as well as in the following patents directed to glare reduction screens having a single treated surface arranged generally parallel to the direction of image transmission, thereby effects of background light:
  U.S. Pat. Nos. 4,911,529 (Van De Ven), 4,756,603 (Ohtani), 4,165,920 (Brown), 2,909,770 (Pugsley),
in the following patents that discloses use of lenticular or microprism sheets as isotropic light diffusers in rear projection systems:
  U.S. Pat. Nos. 4,730,697 (McKechnie et al.), 5,400,114 (Yoshida et al.), 5,457,572 (Ishii et al.), 5,581,407 (Mitani et al.), 5,760,955 (Goldenberg et al.), 6,002,829 (Winston et al.), 6,157,491 (Watanabe et al.), 6,025,897 (Weber et al.), and 6,169,633 (Watanabe), and
in the following patents directed to use of microprism or lenticular sheets to increase the field of view in non-projection or direct sight type LCD systems:
  U.S. Pat. Nos. 5,745,199 and 5,555,476, both to Suzuki et al.

These and other patents offer guidance on altering the properties of optical surfaces, though not for the purposes of the present invention.

Bulk Diffusion

This alternative solution to the problem of achieving privacy screening from more than one side using a single microprism or lenticular sheet involves including a diffusing agent in at least a portion or section of the sheet, and arranging surfaces of the microprism or lenticular sheet so that light along selected optical paths is attenuated before reaching the surfaces.

The use of diffusing materials for what may be thought of as "collimation" should not be confused with the use of diffusing materials for collimation in arrangements such as the one disclosed in U.S. Pat. No. 5,837,346 (Langille et al.). In the arrangement disclosed in U.S. Pat. No. 5,837,346, a combination of bulk diffusion and surface texturing is used to achieve the same effect as a Fresnel lens, i.e., causing light incident on the rear of the screen at a wide range of angles to exit the front of the screen in parallel. Although one effect of the present invention is also to achieve "collimation" (in the broadest sense of the word) of the transmitted image, the "collimation" provided by the multiple zone privacy screen of the invention, i.e., attenuation rather than focusing of light incident at non-parallel angles, is not to be confused with the type of collimation conventionally provided in rear projection screens. Whereas the present invention seeks to narrow the field-of-view of an image and prevent the image, or portions of an image, from being viewed at angles outside a desired range, collimators of the type used in rear projection screens seek to concentrate the light without attenuation. This may be accomplished solely by using Fresnel lens structures, with no need for any sort of diffuser, but it can also be achieved, at least according to U.S. Pat. No. 5,837,346, by combining bulk diffusion with surface texturing to impart asymmetrical diffusion characteristics to the screen.

Thus, while the present invention shares with the projection screen described in U.S. Pat. No. 5,837,346, an embodiment that also happens to use bulk diffusion, the functions of the respective diffusion materials differ substantially. The prior collimating diffusion structure seeks to provide a collimating lens effect in which light incident at a wide range of angles exits the screen at a narrower range of angles, while the diffusion structure of the present invention simply seeks to attenuate all light incident on the screen that is outside the narrower range of angles.

One reason for the substantial difference in function between "collimating" structures of the type disclosed U.S. Pat. No. 5,837,346 and that the present invention, is essentially that rear projection collimation of the type disclosed in U.S. Pat. No. 5,837,346 requires that the bulk diffusion material have asymmetric or anisotropic diffusion characteristics, whereas the corresponding bulk diffusion materials of the present invention may diffuse light isotropically (although anisotropic diffusion may also work), the privacy screening effect being achieved not by differences in scattering patterns, but in the lengths of the paths through which light traverse the material, resulting in an especially simple privacy screen construction that nevertheless achieves privacy screening on at least two sides of an image.

SUMMARY OF THE INVENTION

It is according a first objective of the invention to provide a more versatile field-of-view controlling arrangement in which the field-of-view may be controlled or restricted form any side over any range of angles, including from multiple sides.

It is a second objective of the invention to provide a field-of-view controlling arrangement that can be used not only to restrict the field-of-view from one or more sides, but also to improve or modify images visible in the unrestricted portion of the field-of-view.

It is a third objective of the invention to provide an improved privacy screen that restricts the field-of-view of an image from at least two sides, and yet that consists of a single microprism or lenticular sheet.

It is a fourth objective of the invention to extend the range of applications for the microprism or lenticular privacy screens disclosed in U.S. patent application Ser. Nos. 09/481,942 and 09/583,732 to applications that require multiple privacy zones, without significantly increasing cost or difficulty or manufacture.

It is a fifth objective of the invention to provide a privacy screen that is suitable for use with lenticular as well as microprism sheets, the lenticular sheets offering additional possibilities of image modification or enhancement, including image magnification, while still providing privacy screening effects using a single sheet.

It is a sixth objective of the invention to provide privacy screens having increased versatility and yet that are simple to manufacture and that can easily be adapted for use in a variety of contexts.

It is a seventh object of the invention to provide privacy screens suitable for use as a computer monitor or television overlay, and which limits viewing of a displayed image to persons situated at a specific range of angles relative to the monitor or television.

It is a eighth objective of the invention to provide privacy screens that may be applied to a window, and which not only serve as a blind, but also can be arranged to improve the view through the window, and/or to replace an undesired view with images or graphics.

These objectives are achieved by:

in accordance with the principles of a first preferred embodiment of the invention, altering at least two sets of mutually parallel surfaces of a microprism or lenticular sheet and a second set of mutually parallel surfaces of a microprism or lenticular sheet that are oriented at different angles relative to a principal plane of the sheet, and/or portions of the two sets of mutually parallel surfaces, so as to attenuate light on selected sides of the field-of-of view for an image transmitted through the sheet by applying a light attenuating surface treatment to the surfaces, or also in accordance with the principles of the first preferred embodiment of the invention, altering at least one set of mutually parallel surfaces, or corresponding curved surfaces, of a microprism or lenticular sheet in which the microprisms or lenticular elements are formed by polyhedra or other discrete structures such as frustoconical lenticules, and alternatively, in accordance with the principles of a second preferred embodiment of the invention, including a diffusing agent in the material of the sheet, and arranging selected surfaces of the microprism or lenticular sheet so that light along selected optical paths is attenuated before exiting the selected surfaces.

Each of the two preferred embodiments of the invention provides a privacy screen that can be adapted to restrict viewing of an image from at least one or two sides of the potential field-of-view, with some implementations offering the possibility of restricting viewing from three sides, and of achieving additional optical effects such as expansion of the field-of-view in the unrestricted directions. Furthermore, the privacy screen of each of the two preferred embodiments of the invention is made of a single sheet, which can be arranged to serve as a very simple screen overlay to prevent observers situated on different sides of the screen from eavesdropping.

In one implementation of the first preferred embodiment of the invention, the above-described surface treatment principles may be applied to a conventional microprism sheet of the type described in U.S. patent application Ser. No. 09/481,942, i.e., a microprism sheet having a plurality of v-shaped grooves forming two sets of parallel surfaces that intersect to form grooves, by surface treating both surfaces of alternate ones of the grooves.

In other implementations of the first preferred embodiment of the invention, the microprism sheets may include truncated prism structures formed by spacing apart the v-shaped grooves, lenticular sheets having v-shaped grooves and one or two-dimensional lens structures, and sheets with grooves on opposite sides of the sheet, either aligned or alternating, and either spaced-apart (to form truncated prism structures) or adjacent to form v-shaped prism structures).

In still further implementations of the first preferred embodiment of the invention, the sheets to which the surface treatments are applied are polyhedral structures, which may include truncated tetrahedral lenticular structures, tetrahedral structures, other multifaceted or polyhedral lenticular structures, and frustoconical or similar structures, and in which light-attenuating surface treatments are applied to at least one of the mutually parallel or curved sets of surfaces that form the discrete lenticular structures.

The surface treatments applied may consist of any surface treatments that have the effect of absorbing or scattering light and that can be applied to selected surfaces by means of a mask, control of the surface treatment tool, or use of an appropriate die, including application of opaque or light diffusing coatings, delustering, chemical or laser etching, casting, and differential polishing of previously roughened surfaces, as well as any other surface treatment methods described in the above-cited patents or patent applications, or that are known or may become known to those skilled in the art. Further, as in the privacy screens of the above-cited applications, it is also possible, in addition to surface treatments that merely block or scatter light, to add surface treatments result in the appearance of images or graphics at selected angles.

With respect to the second preferred embodiment of the invention, rather than forming a privacy screen by preventing viewing of an image in the direction of treated surfaces and permitting viewing of the image through the untreated surface (or vice versa), the same effect can be achieved by forming the microprism or lenticular sheet using a bulk diffuser in at least a portion or section of the sheet, the bulk diffuser being preferably concentrated (if not evenly distributed) in the portion or section of the sheet adjacent the light entrance side. In contrast to projection screen diffusers, which seek to collimate light by causing it to bend towards a preferred fission axis, the diffuser of the invention should be arranged so that the diffusion effect depends solely on the amount of diffusing material that must be traversed by a particular ray of the image transmitted by the sheet. Although the material of the bulk diffuser may be isotropic, it will be appreciated that anisotropic materials may also be utilized so long as the anisotropy causes greater attenuation in the direction of desired privacy than in the viewing direction, In the embodiment in which the sheet is made up of parallel v-shaped grooves, the dimensions of the grooves and sheet may generally be the same as those described in copending U.S. patent application Ser. No. 09/481,581, although the invention is not limited to particular groove dimensions. As explained, in the parent application, grooves having a pitch on the order of 0.12 to 0.14 inches are undiscernable by a person having normal vision at a typical distance from a screen, and thus may be appropriate for the privacy screening structure of the invention. Depending on the shapes of the prisms and the locations of the coatings, it may also be necessary to reduce the pitch and size of the grooves in order to prevent the viewer from perceiving Moiré effects resulting from the contrast between the treated and untreated portions of the sheet.

Also as in the aforementioned patent applications, and especially U.S. patent application Ser. No. 09/583,731, the configuration of the microprism or lenticular sheet may itself be varied by, for example, varying the pitch, shapes, or sizes of the grooves, prisms, or lenses, or the thickness of the sheet, relative to the center or edges of the sheet, or by constructing the sheet as a curved rather than planar structure.

Finally, while the privacy screens of the preferred embodiments of the invention are especially suitable for use in restricting eavesdropping by persons situated above or below a computer monitor or television screen, the invention is not to be limited to a particular application. Instead, it is anticipated that the privacy screen of the invention may be used in any of a variety of potential applications that might involve restricted viewing of an image or scene, including applications in which the privacy screens of the invention are applied to windows to serve as blinds, and applications that involve restricting viewing of more than two sides of the images, for example by surface treating multiple sets of surfaces of a two-dimensional lenticular sheet, or by appropriate use of a bulk diffuser in such a sheet. When applied to a window, the privacy screens of the invention not only can provide privacy and restrict incoming light, but also can modify the view through the window by using the prisms or lenticular structures of the overlay to bend light is selected directions, or modify the view by adding images or graphics visible at selected angles.

BRIEF DESCRIPTION OF THE DRAWINGS

FIG. 1 is an isometric view of a privacy screen of the type disclosed in U.S. patent application Ser. No. 09/481,942.

FIG. 2 is a plan view, taken either from the top or side depending on the orientation of the sheet, of the privacy screen illustrated in FIG. 1.

FIG. 3 is a perspective view of a screen overlay using privacy screens of the type illustrated in FIGS. 1 and 2.

FIG. 4 is a plan view of a privacy screen having multiple privacy zones constructed in accordance with the principles of a first preferred embodiment of the invention.

FIG. 5 is a plan view of a modification of the privacy screen illustrated in FIG. 4, in which tops of the prism structures are truncated.

FIG. 6 is another modification of the privacy screen illustrated in FIG. 4, which includes a lenticular structure.

FIG. 7 is a plan view of yet another modification of the privacy screen illustrated in FIG. 4, in which the privacy screen includes aligned, spaced, parallel grooves and lenticular structures on opposite sides of the sheet.

FIG. 8 is a plan view of a modification of the privacy screen illustrated in FIG. 4 in which only portions of the surfaces in each set of parallel surfaces are treated to attenuate or scatter light passing through, and in which the screen includes alternating parallel grooves on opposite sides of the sheet.

FIG. 9 is a plan view of a modification of the privacy screen of FIG. 4, in which only portions of the surfaces of a structure otherwise identical to that of FIG. 4 are treated.

FIG. 10 is a plan view of a further modification of the privacy screen of FIG. 4, in which only portions of the surfaces of the microprism screen are treated, and in which the microprism sheet includes aligned, adjacent parallel grooves.

FIG. 11 is a plan view of a privacy screen constructed in accordance with the principles of a second preferred embodiment of the invention, in which the privacy screen includes a bulk diffuser rather than surface treatments, the structure of the sheet otherwise corresponding to that shown in FIG. 5.

FIG. 12 is a plan view of a privacy screen having, according to the principles of the second preferred embodiment of the invention, a bulk diffuser rather than surface treatment, but otherwise corresponding to the structure shown in FIG. 7.

FIG. 13 is a plan view of a privacy screen made up of a lenticular sheet with a bulk diffuser according to the principles of the second preferred embodiment of the invention.

DETAILED DESCRIPTION OF THE PREFERRED EMBODIMENTS

Figure 16:
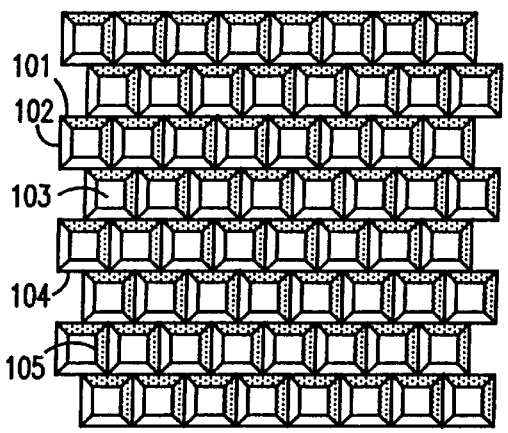
FIGS. 15–18 are plan views of the lenticular sheet of FIG. 14, in which different surfaces are treated to control the viewing angle in different directions.
Figure 18:
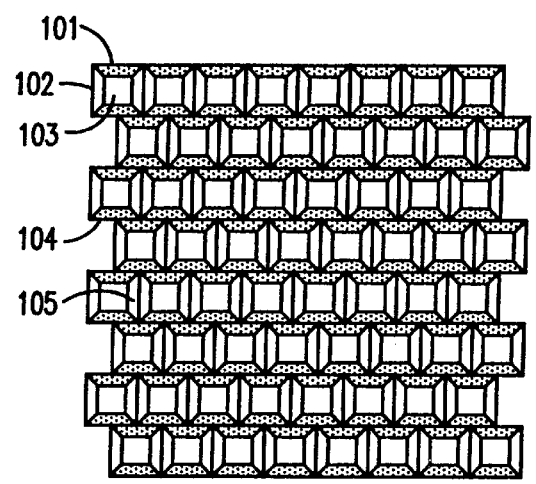
Figure 15:
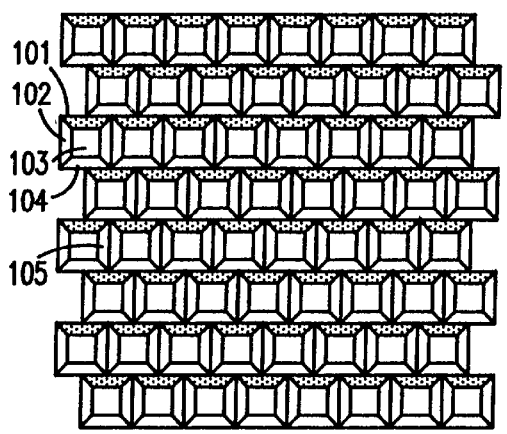
Figure 17:
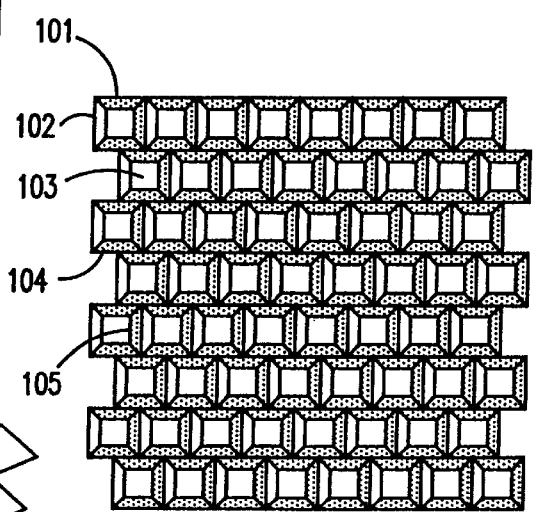

FIGS. 4–10 illustrate the principles of a version of a first preferred embodiment of the invention in which a field-of-view controlling or privacy screening effect is achieved by altering at least two sets of mutually parallel surfaces of a microprism or lenticular sheet, and/or portions of the two sets of mutually parallel surfaces, the two sets of surfaces being oriented at different angles relative to a principal plane of the sheet, so as to attenuate light in selected directions by applying a light attenuating surface treatment to the surfaces. FIGS. 11–13 illustrate a second preferred embodiment of the invention in which the microprism or lenticular sheet is made of a bulk diffusing material and the surfaces of the sheet are arranged so that light transmitted along selected optical paths is attenuated before exiting the sheet through a first set of mutually parallel surfaces while light transmitted along other optical paths is relatively unattenuated before exiting the sheet through a second set of mutually parallel surfaces oriented at a nonzero angle relative to the first set of mutually parallel surfaces. FIGS. 14–57 illustrate variations of the first preferred embodiment of the invention in which the microprism or lenticular sheet is made up of "two-dimensional" or discrete lenticular structures having at least three intersecting sets of mutually parallel surfaces, or at least one set of curved surfaces extending in directions transverse to directions in which the field-of-view is to be limited, and in which at least one set of the mutually parallel or curved surfaces is altered by applying a light-attenuating treatment to the mutually parallel or curved surfaces.

As explained above, each of the two preferred embodiments of the invention provides a field-of-view controlling arrangement or privacy screen that restricts viewing of an image from more than one side of the potential field-of-view. Furthermore, the field-of-view controlling arrangement of each of the two preferred embodiments of the invention is made of a single sheet, which can be arranged to serve as a very simple screen overlay, for example to prevent observers from viewing a screen from both above the screen and below the screen. The dimensions of the sheets are essentially determined by the technology used to form the sheets and to treat the surfaces, although the pitch of the grooves or lenticular elements is preferably made small enough to eliminate perception of the grooves or lenticular elements, and/or Moiré patterns resulting from parallel arrangement of light transmitting and diffusing surfaces. A pitch of less than ten grooves or elements per inch, and preferably less than twenty grooves per inch, will provide the best appearance most applications, although the invention is not in principle limited to particular sheet dimensions or pitches.

Turning to the first preferred embodiment of the invention, in each of FIGS. 4–10, the treated surfaces are represented by elements 20,21, drawn as opaque or light-diffusing coatings having an exaggerated thickness so that the principles of the first preferred embodiment may be more readily understood. It is to be understood, however, that the surface treatments applied may consist of any surface treatments that have the effect of absorbing or scattering light and that can be applied to selective surfaces by means of a mask, die, tool, or the like. In addition to coatings, possible surface treatments include delustering, chemical or laser etching, casting, and differential polishing of previously roughened surfaces, as well as any other surface treatment methods described in the above-cited patents or patent applications, or that are known or may become known to those skilled in the art. For example, if the surfaces are treated by printing, graphic images may be added so that the block image or scene is replaced by a graphic image.

Also in each of FIGS. 4–10, the untreated surfaces are represented by surfaces 24,25. Although referred to as "untreated," however, it is to be understood that surfaces 24,25 may in fact be treated to enhance transmission of light through the surfaces, for example by positioning, curing, adding transparent protective coatings, and or printing of portions of the surfaces so as to superimpose graphic images on the images being viewed through the screen. The term "untreated" is intended to mean "not altered to diffuse or attenuate light."

Turning to specific implementations of the first preferred embodiment of the invention, FIG. 4 illustrates an arrangement in which the above-described surface treatment is applied to a conventional microprism sheet of the type described in U.S. patent application Ser. No. 09,481,942, i.e., a microprism sheet having a plurality of grooves defined by two intersecting sets of surfaces. In this implementation of the first preferred embodiment, the privacy screening effect is obtained by surface treating both surfaces 20,21 of alternate grooves to create a louver, so that rays 22 at a first range of angles A and rays 23 at a second range of angles B are selectively attenuated or blocked.

In the implementation illustrated in FIG. 5, the standard microprism sheet illustrated in FIG. 4 is modified by spacing the grooves to form truncated prism structures, which has the advantage that all parallel surfaces in the sheet may be coated, rather than alternate parallel surfaces as in the embodiment of FIG. 4. This should have the effect of simplifying manufacture of the screen without adversely affecting its optical properties, the angles of the privacy zones created by treated surfaces 20,21 being the same in this implementation as in the implementation of FIG. 4.

In the implementation illustrated in FIG. 6, the sheet includes untreated lenticular elements 26. Again, as in implementation of FIG. 5, the treated surfaces 20,21 constitute all parallel groove-defining surfaces on one side of the sheet, enabling simplified manufacture of the privacy screen. The use of lenticular elements 26 permits optical effects to be added to the privacy screening effect. For the illustrated semi-cylindrical lenticular elements, the optical effect obtained is magnification of the image, although it will be appreciated that other effects could be obtained by varying the shape of the lenticular elements. The lenticular elements may, for example, include conventional one or two dimensional lenticular elements (i.e., barrel shaped or hemispherical lenses), and lens structures having concavities or other departures from the illustrated structures.

The implementation illustrated in FIG. 7 also involves lenticular structures 26, but in order to further extend the image modification capabilities of the lenticular structures, includes parallel, spaced-apart grooves on both sides of the microprism sheet, enabling inclusion of the lenticular structures 26 on either or both sides of the sheet. In the illustrated implementation, the lenticular structures 26 may, depending on their exact shape, be used for such purposes as image compression, modification, or special effects.

The implementations illustrated in FIGS. 8–10 involve partial treatment of surfaces of the various sheets. While achieving treatment of portions of the groove surfaces would appear to be technically more difficult than treatment of complete surfaces, such partial treatment permits the use of accordion-shaped sheets, i.e., sheets with alternating grooves on opposite sides of the sheet, as illustrated in FIG. 8, and/or enables treatment of each groove rather than alternating grooves without having to space the grooves apart (or truncate the prisms), as can be seen by comparing FIG. 9 with FIG. 4 and FIG. 10 with FIG. 7.

According to the variation of the first preferred embodiment illustrated in FIGS. 14–18, the field-of-view controlling arrangement is made up of a lenticular sheet that include staggered rows of lenticular elements in the form of truncated tetrahedral structures 100 having five sets of mutually parallel surfaces indicated by reference numerals 101–105. According to the principles of this embodiment of the invention, any one or more of surfaces 101–105 may be selectively treated to provide a privacy screening effects, the range of angles of which is determined by the orientations of the treated surfaces in a manner similar to the that of the privacy screens illustrated in FIGS. 1–10. For example, in the arrangement of FIG. 15, only surface 101 is treated, while in the arrangements of FIGS. 16–18, surfaces 101 and 105; 101, 104, and 105; and 101 and 104 are respectively subjected to a light-attenuating surface treatment in the manner described above with respect to FIGS. 1–10.

FIGS. 19–23 illustrate a field-of-view controlling arrangement similar to that of FIGS. 14–18 except that the truncated tetrahedral lenticular elements 200 are arranged in a grid rather than in staggered rows. Again, any one of more of the surfaces 201–205 may be subjected to a light-attenuating surface treatment in the manner described above.

FIGS. 24–33 illustrate further variations of the field-of-view controlling arrangements of the first preferred embodiment in which the lenticular elements are non-truncated tetrahedral structures (300,400) in staggered rows (FIGS. 24–28) or non-staggered rows (FIGS. 29–33) and in which any set of surfaces 301–304, 401–404 may be subjected to a light attenuating surface treatment, while FIGS. 34–55 show corresponding arrangements of truncated or non-truncated hexahedral structures 500,600 forming a honeycomb pattern and in which any of surfaces 501–507, 601–606 are treated to create privacy screening effect.

Figure 57:
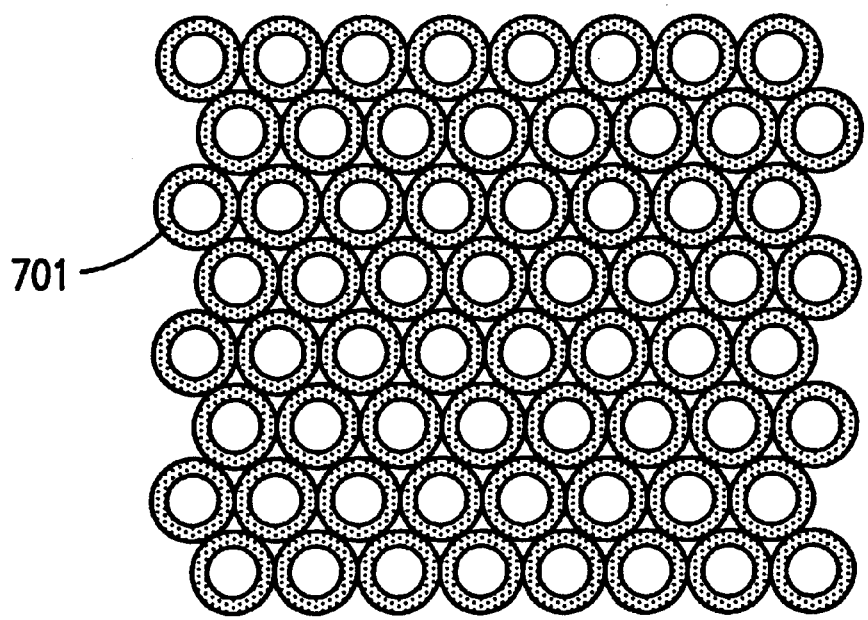
FIG. 57 is a plan view of the lenticular sheet of FIG. 56.
Figure 56:
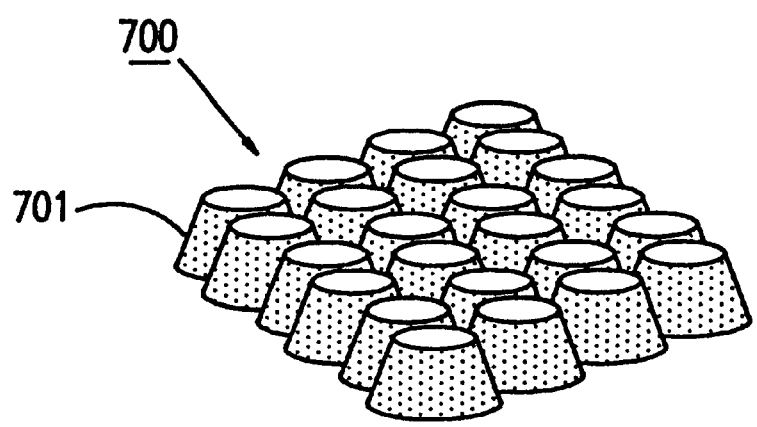
FIG. 56 is a perspective view of a privacy screen made up of a lenticular sheet including frustoconical structures having a treated surface according to the principles of another variation of the first preferred embodiment of the invention.

Finally, FIGS. 56 and 57 show a variation of the first preferred embodiment of the invention in which the lenticular elements are frustoconical-shaped structures 700 having surfaces 701 and 702 in which the curbed surface 701 which forms sides of the structure is provided with a light-attenuating surface treatment to provide a 360° privacy screening effect.

One advantage of in using staggered rows or a honeycomb pattern of lenticular elements is that it reduces the so-called "staircase" effect, which results in distortion or blurring of non-horizontal or vertical lines, caused by the quantum or discrete nature of aligned microprism or lenticular elements. In addition, non-truncated discrete elements have the advantage of providing maximal glare reduction and expansion of the field-of-view in non-restricted directions.

It will of course be appreciated by those skilled in the art that the different discrete lenticular structures illustrated in FIGS. 14–57 represent only a few of the possible geometric shapes that could be adapted to provide a field-of-view controlling or privacy screening effect according to the principles of the first preferred embodiment of the invention, and that the invention is not to be limited to the particular shapes illustrated.

In the specific implementations of the second preferred embodiment of the invention illustrated in FIGS. 11–13, a bulk diffuser is added to sheets having shapes corresponding to those illustrated in FIGS. 5, 7, and 6, respectively. Because the optical paths 30,31 through the diffusing material differ as a result of the orientation of the exit surfaces 32,33, light transmitted along optical paths 30 will be attenuated more than light transmitted along optical paths 31, resulting in a privacy screening effect.

Although some differential attenuation will occur even if the bulk diffuser is even distributed throughout the sheet, the greatest difference in optical paths through the diffusing material will occur if the diffusing material is concentrated at the rear of the sheet, i.e., on the light entrance side, with the front of the sheet being relatively transparent. This is illustrated in FIGS. 11–13 by including separate reference numerals 33 and 34 for respective zones of greater and lesser concentration of diffusing material.

Figure 14:
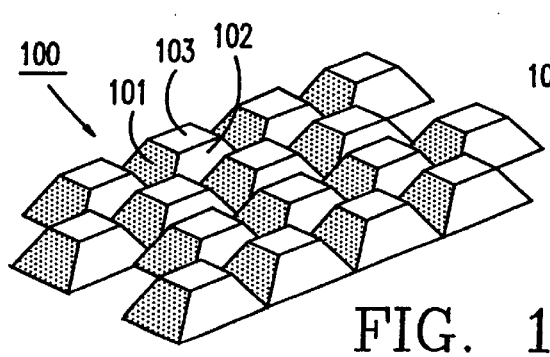
FIG. 14 is a perspective view of a privacy screen made up of a lenticular sheet including truncated tetrahedral structures arranged in staggered rows and having at least one treated set of mutually parallel surfaces according to the principles of a variation of the first preferred embodiment of the invention.
Figure 21:
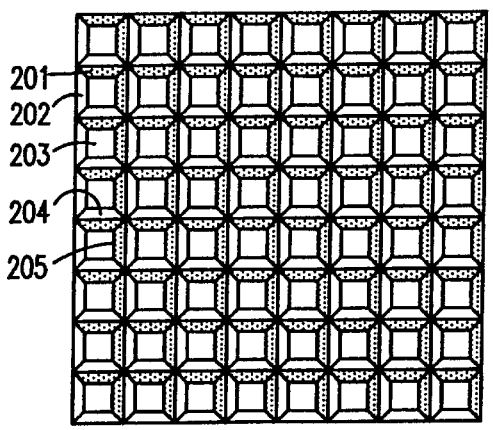
FIGS. 20–23 are plan views of the lenticular sheet of FIG. 19, in which different surfaces are treated to control the viewing angle in different directions.
Figure 23:
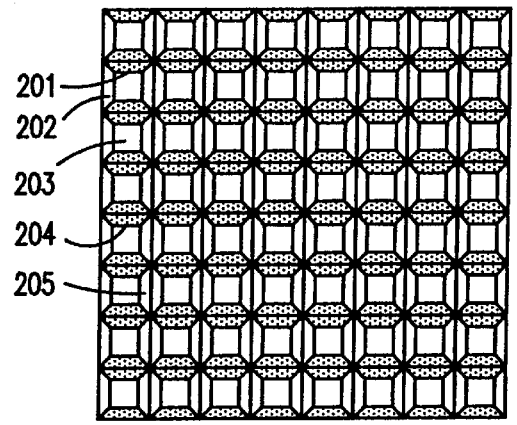
Figure 20:
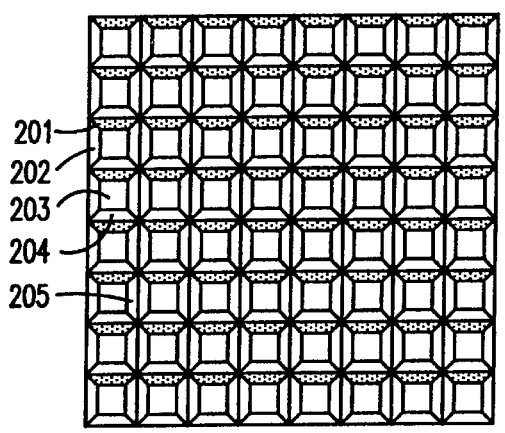
Figure 22:
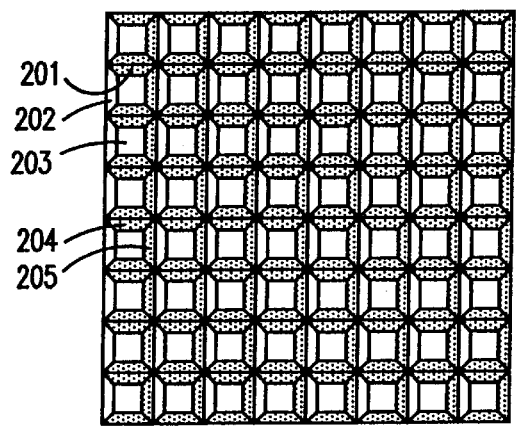
Figure 19:
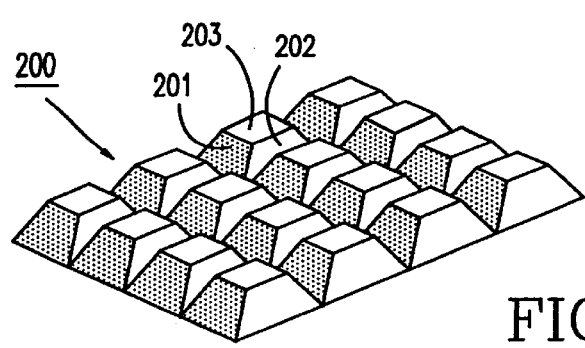
FIG. 19 is a perspective view of a privacy screen made up of a lenticular sheet including truncated tetrahedral structures arranged in a grid pattern and having at least one treated set of mutually parallel surfaces according to the principles of another variation of the first preferred embodiment of the invention.
Figure 26:
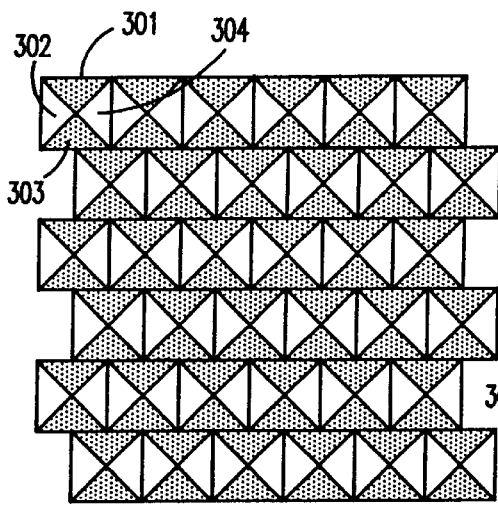
FIGS. 25–28 are plan view of the lenticular sheet of FIG. 24, in which different surfaces are treated to control the viewing angle in different directions.
Figure 28:
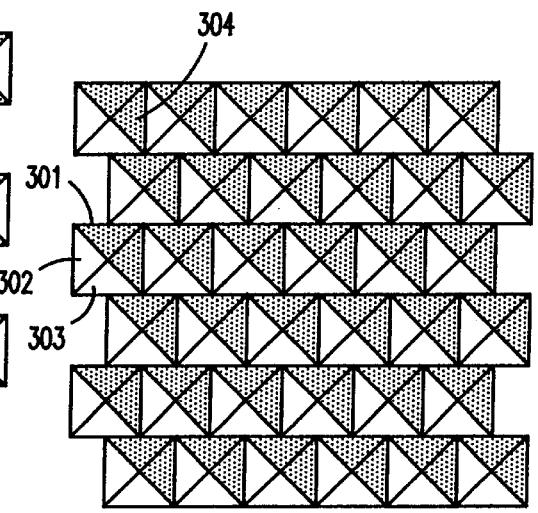
Figure 25:
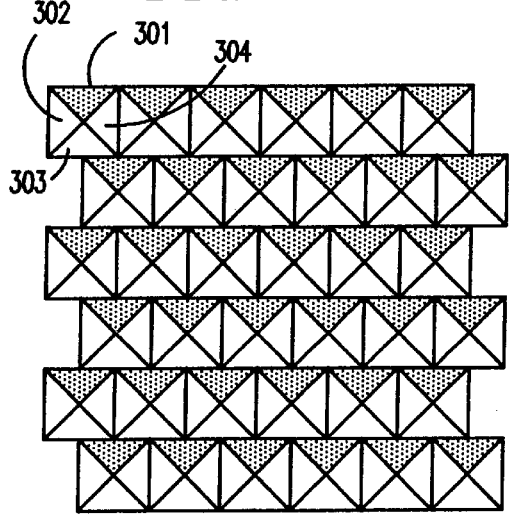
Figure 27:
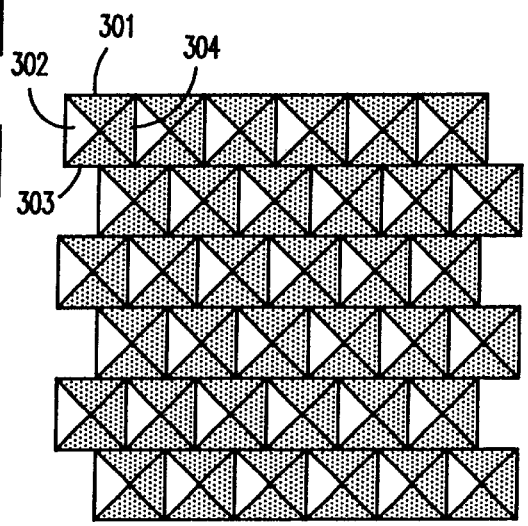
Figure 24:
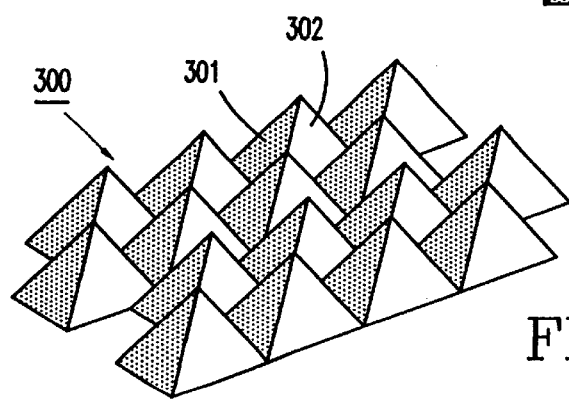
FIG. 24 is a perspective view of a privacy screen made up of a lenticular sheet including tetrahedral structures arranged in staggered rows and having at least one treated set of mutually parallel surfaces according to the principles of another variation of the first preferred embodiment of the invention.
Figure 31:
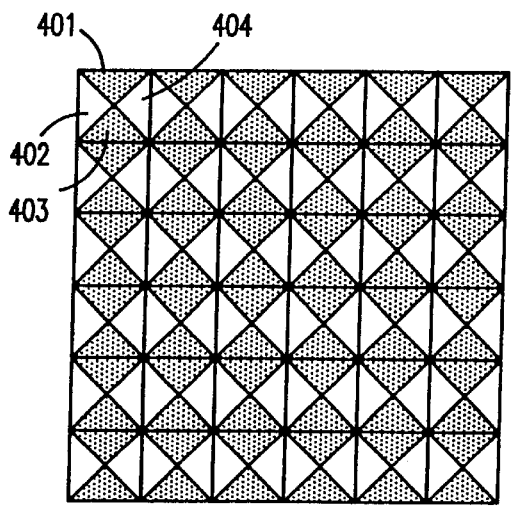
FIGS. 30–33 are plan views of the lenticular sheet of FIG. 29, in which different surfaces are treated to control the viewing angle in different directions.
Figure 33:
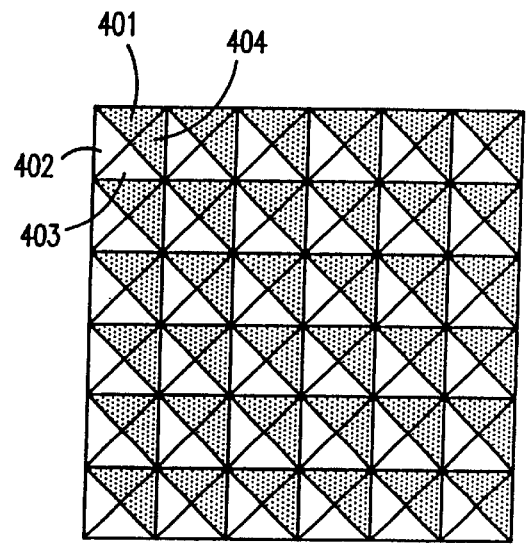
Figure 30:
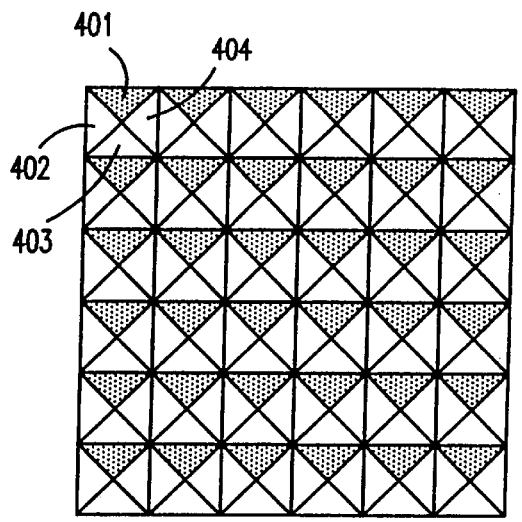
Figure 32:
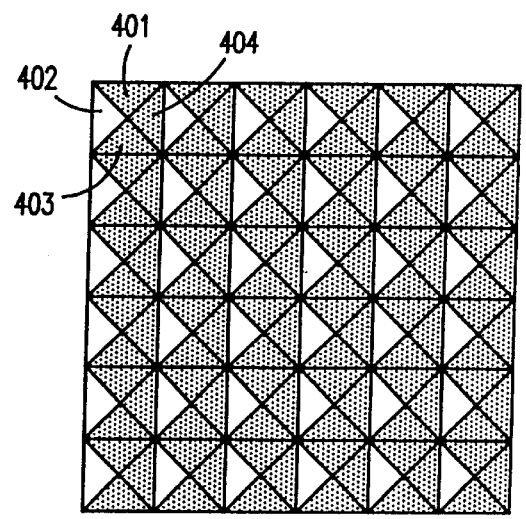
Figure 29:
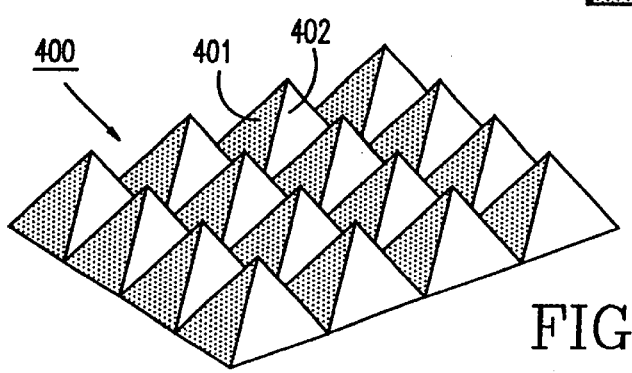
FIG. 29 is a perspective view of a privacy screen made up of a lenticular sheet including truncated tetrahedral structures arranged in a grid pattern and having at least one treated set of mutually parallel surfaces according to the principles of another variation of the first preferred embodiment of the invention.
Figure 36:
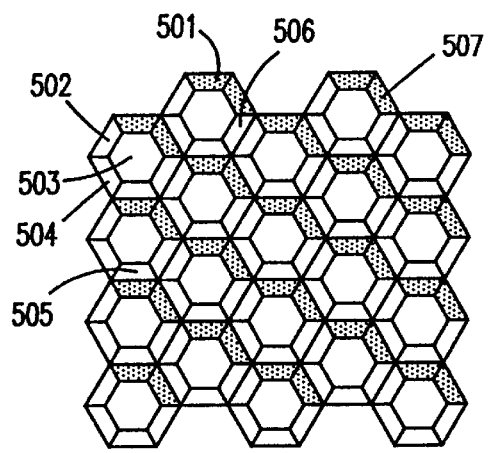
FIGS. 35–44 are plan views of the lenticular sheet of FIG. 34, in which different surfaces are treated to control the viewing angle in different directions.
Figure 38:
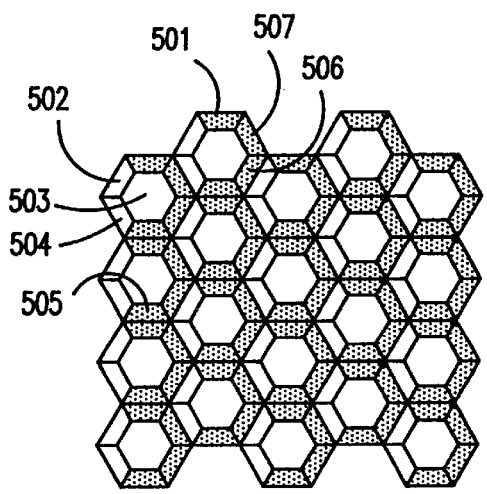
Figure 35:
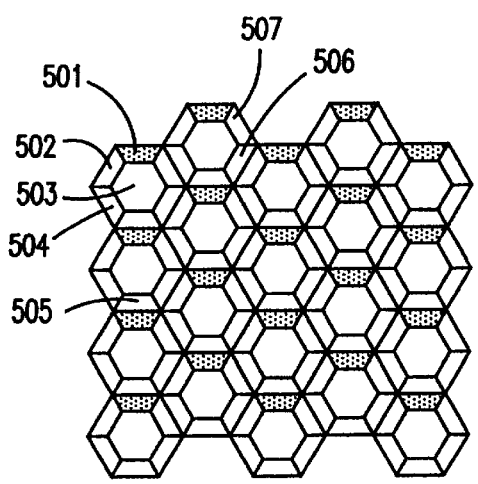
Figure 37:
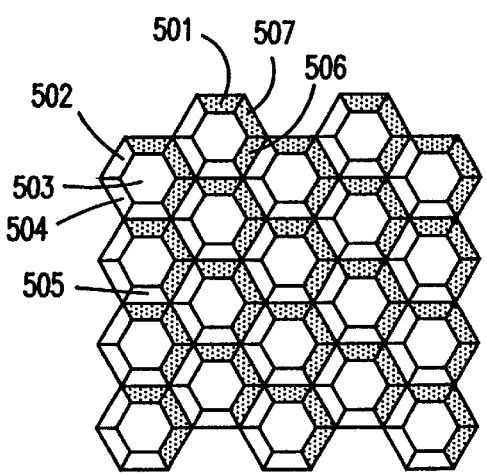
Figure 34:
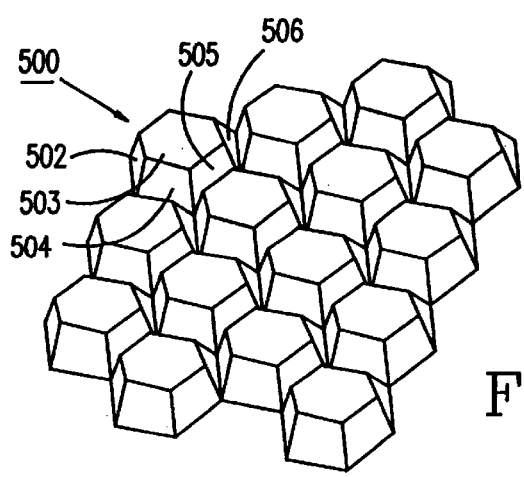
FIG. 34 is a perspective view of a privacy screen made up of a lenticular sheet including truncated hexahedral structures arranged in a honeycomb pattern and having at least one treated set of mutually parallel surfaces according to the principles of another variation of the first preferred embodiment of the invention.
Figure 41:
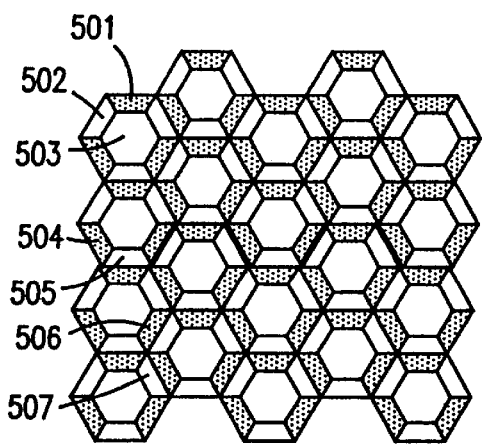
Figure 44:
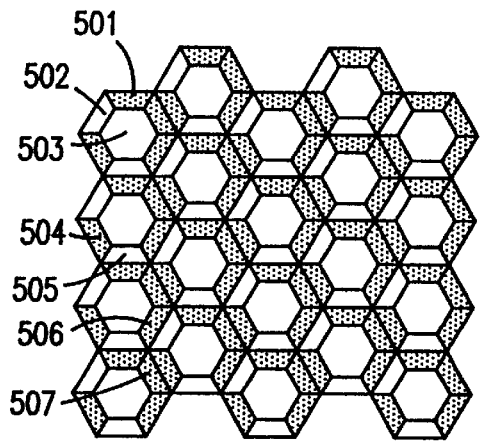
Figure 40:
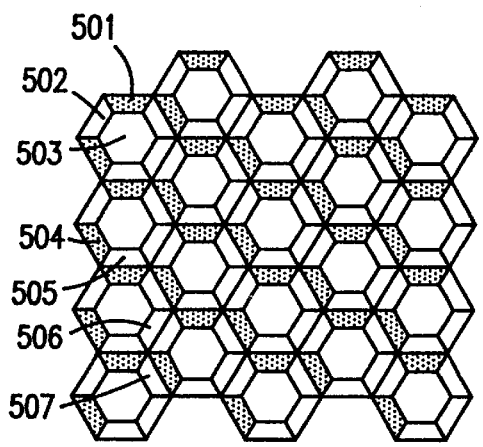
Figure 43:
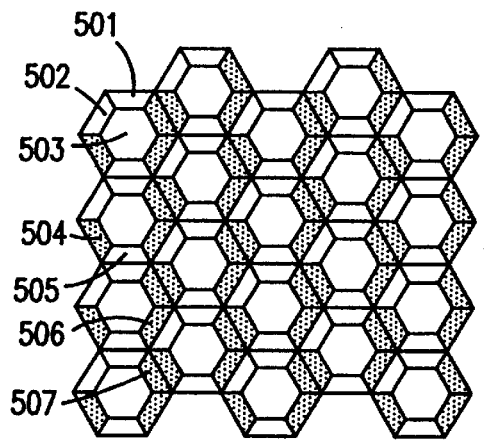
Figure 39:
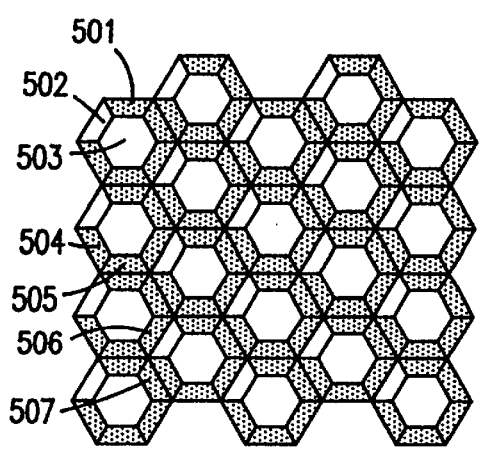
Figure 42:
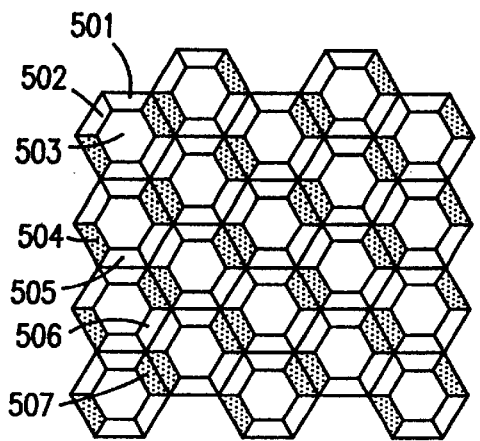
Figure 47:
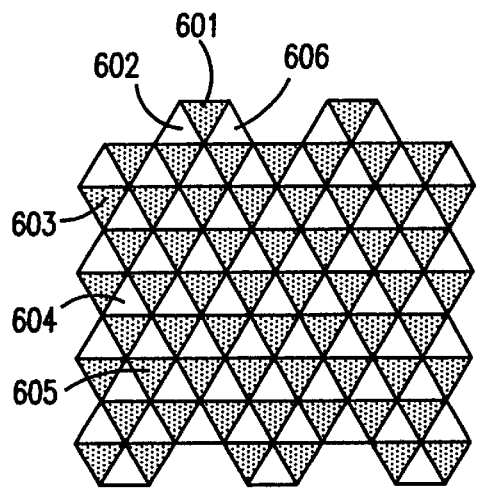
FIGS. 46–55 are plan views of the lenticular sheet of FIG. 45, in which different surfaces are treated to control the viewing angle in different directions.
Figure 49:
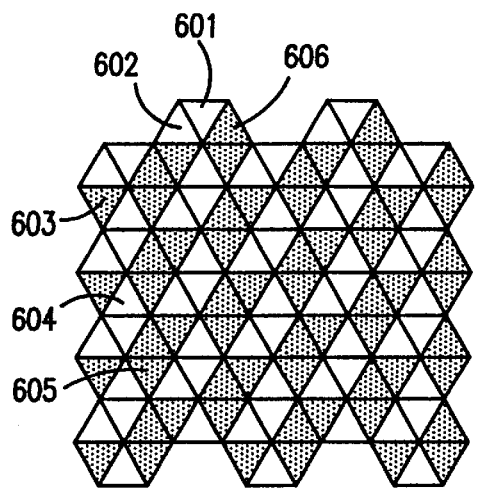
Figure 46:
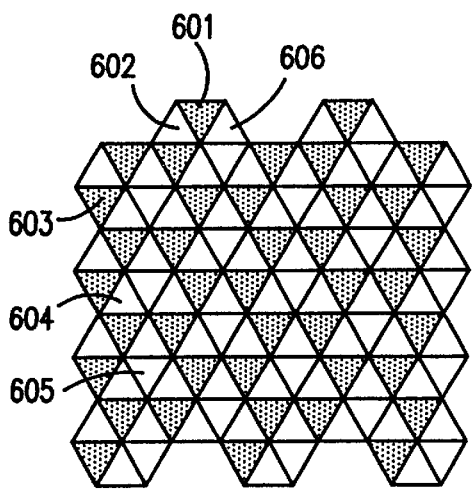
Figure 48:
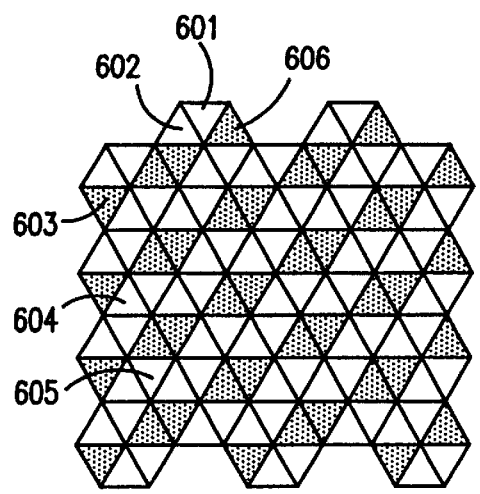
Figure 45:
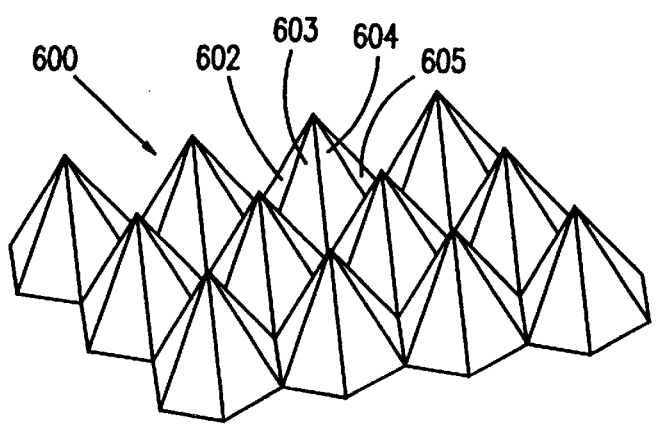
FIG. 45 is a perspective view of a privacy screen made up of a lenticular sheet including tetrahedral structures arranged in a honeycomb pattern and having at least one treated set of mutually parallel surfaces according to the principles of another variation of the first preferred embodiment of the invention.
Figure 52:
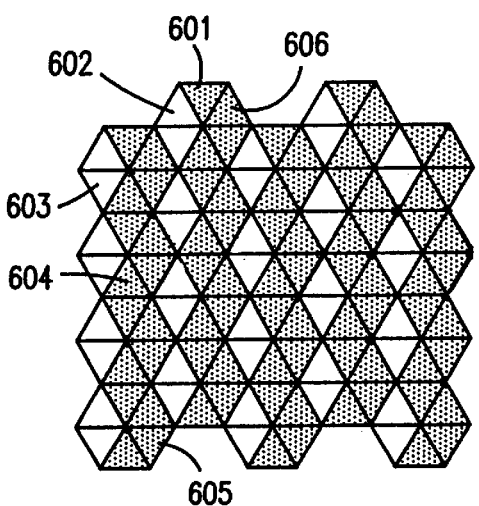
Figure 55:
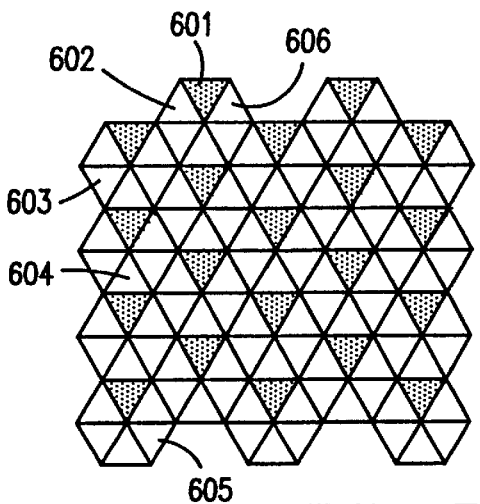
Figure 51:
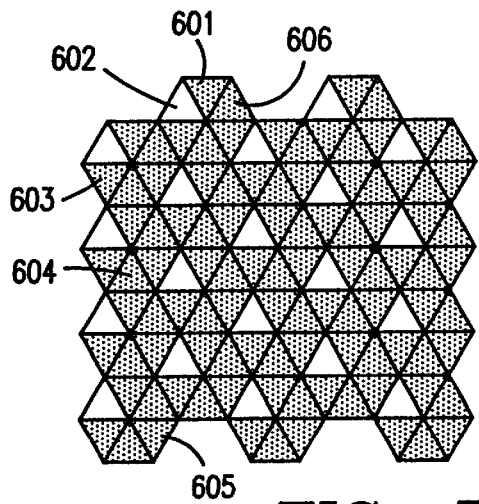
Figure 54:
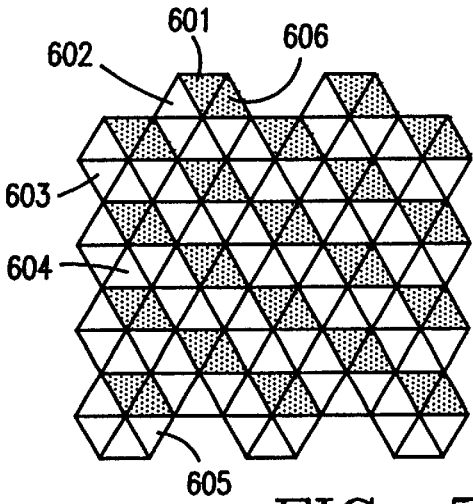
Figure 50:
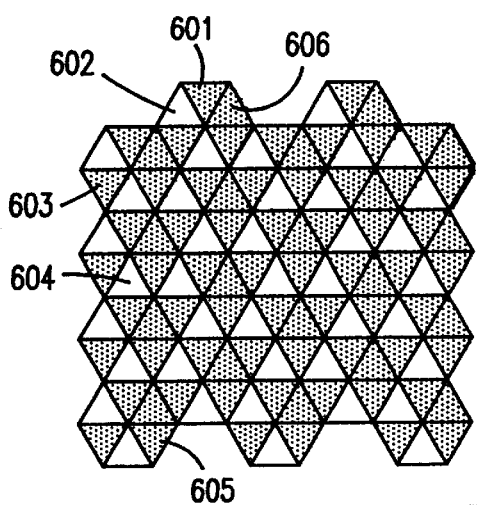
Figure 53:
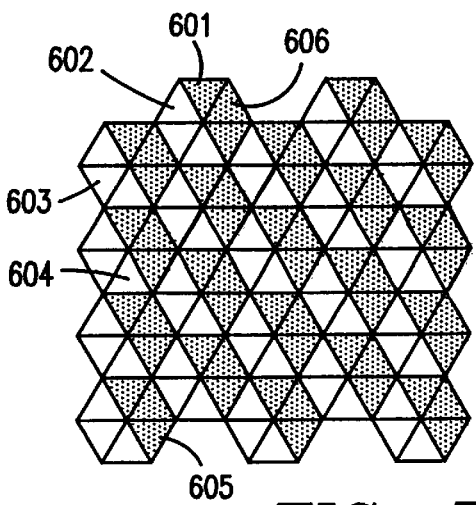

In the arrangement illustrated in FIG. 14, sections 34 are preferably completely transparent in order to optimize the optical effects provided by the use of lenticular elements 35. Alternatively, in any of the implementations illustrated in FIGS. 11–13, it is possible to enhance the effect of unequal path lengths by using an anisotropic diffuser, which passes more light in one direction than in other directions.

As indicated above, the privacy screens of the invention may be used as overlays for video displays, for example to restrict eavesdropping with respect to a computer display. In addition, the privacy screens of the invention may be used as window coverings in order to achieve a variety of effects not possible with conventional mechanical blinds. For example, the privacy screens of the invention have the additional advantage that the prisms or lenticular structures that make up the screen may be used to bend incoming light and improve the view from the window and, if the view from the window does not include any scenes worth expanding, the entire view may be replaced by images or graphics.

Having thus described a number of preferred embodiments of the invention in sufficient detail to enable those skilled in the art to make and use the invention, it will nevertheless be appreciated that numerous variations and modifications of the illustrated embodiment may be made without departing from the spirit of the invention. For example, the illustrated microprism and lenticular sheet configurations are hardly exhaustive of all of the possible configurations for such sheets. Accordingly, it is intended that the invention not be limited by the above description or accompanying drawings, but that it be defined solely in accordance with the appended claims.

What is claimed is:

1. A field-of-view controlling arrangement made up of a single lenticular sheet made up of polyhedral lenticular structures having at least two sets of parallel planar surfaces that intersect to define portions of the lenticular structures, and additional surfaces not included in said two sets of parallel planar surfaces, wherein portions of at least one of said surfaces in said sets of intersecting parallel planar surfaces are arranged to attenuate light transmitted through the sheet, wherein said additional surfaces are transparent, and wherein said light-attenuating portions of said at least one of said surfaces in said sets of intersecting parallel planar surfaces thereby defines a privacy zone for images transmitted through the sheet.

2. A field-of-view controlling arrangement as claimed in claim 1, wherein each of said surfaces in said sets of intersecting parallel surfaces is arranged to attenuate light over an entire extent of the surface.

3. A field-of-view controlling arrangement as claimed in claim 1, wherein said lenticular structures are truncated tetrahedral structures arranged in staggered rows.

4. A field-of-view controlling arrangement as claimed in claim 1, wherein said lenticular structures are truncated tetrahedral structures arranged in a grid pattern.

5. A field-of-view controlling arrangement as claimed in claim 1, wherein said lenticular structures are tetrahedral structures arranged in staggered rows.

6. A field-of-view controlling arrangement as claimed in claim 1, wherein said lenticular structures are tetrahedral structures arranged in a grid pattern.

7. A field-of-view controlling arrangement as claimed in claim 1, wherein said lenticular structures are truncated hexahedral structures arranged in a honeycomb pattern.

8. A field-of-view controlling arrangement as claimed in claim 1, wherein said lenticular structures are truncated hexahedral structures arranged in a honeycomb pattern.

9. A field-of-view controlling arrangement as claimed in claim 1, wherein said lenticular structures are hexahedral structures arranged in honeycomb pattern.

10. A field-of-view controlling arrangement as claimed in claim 1, wherein said intersecting parallel surfaces include surfaces treated by processes selected from the group consisting of coating processes, delustering, chemical or laser etching, casting, and differential polishing of previously roughened surfaces.

* * * * *